United States Patent Office 3,767,817
Patented Oct. 23, 1973

3,767,817
TETRACYCLIC AMINES IN AN ANTIDEPRESSANT
COMPOSITION
Charles Ferdinand Huebner, Chatham, N.J., assignor to
Ciba-Geigy Corporation
No Drawing. Continuation-in-part of application Ser. No.
809,002, Mar. 20, 1969, which is a continuation-in-part
of application Ser. No. 793,610, Jan. 23, 1969, which
in turn is a continuation-in-part of application Ser. No.
718,363, Apr. 3, 1968, all now abandoned. This application July 25, 1969, Ser. No. 845,083
Int. Cl. A61k 27/00
U.S. Cl. 424—330    1 Claim

ABSTRACT OF THE DISCLOSURE 11-aminoalkyl-9,10-ethenoanthracenes, e.g. those of the formula

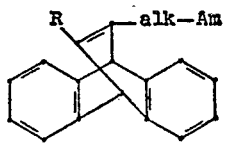

Am = an amino group
alk = alkylene or aralkylene
R = H, etherified or esterified OH, aliphatic, araliphatic, or aromatic radical acyl derivatives, N-oxides, quaternaries and salts thereof are antidepressants.

CROSS-REFERENCES TO RELATED APPLICATIONS

This is a continuation-in-part of application Ser. No. 809,002, filed Mar. 20, 1969 (now abandoned), which in ture is a continuation-in-part of application Ser. No. 793,610, filed Jan. 23, 1969, now abandoned, which in turn is a continuation-in-part of application Ser. No. 718,363, filed Apr. 3, 1968 (now abandoned).

SUMMARY OF THE INVENTION

The present invention concerns and has for its object the provision of new 11-aminoalkyl-9,10-ethenoanthracenes, preferably of those having Formula I

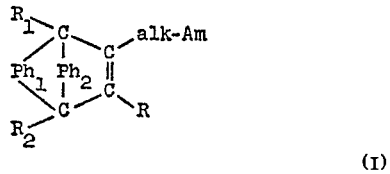

(I)

in which each of $Ph_1$ and $Ph_2$ is a 1,2-phenylene radical, alk is lower alkylene or aralkylene, Am is an amino group, R is hydrogen, etherified or esterified hydroxy, an aliphatic, araliphatic or aromatic radical and each of $R_1$ and $R_2$ is hydrogen, free, etherified or esterified hydroxy or an aliphatic radical, or acyl derivatives, N-oxides, quaternaries and salts thereof, as well as of corresponding pharmaceutical compositions and of methods for the preparation and application of these products. Said compositions are useful antidepressants, for example, in the treatment or management of exo- or endogenous depressions.

DESCRIPTION OF THE PREFERRED EMBODIMENT

The 1,2-phenylene radicals $Ph_1$ and $Ph_2$ are unsubstituted or substituted in the remaining 4 positions by one or more than one, preferably one or two, of the same or different substituents, for example, lower alkyl, e.g. methyl, ethyl, n- or i-propyl or -butyl, free, etherified or esterified hydroxy or mercapto, such as lower alkoxy or alkylmercapto, e.g. methoxy, n- or i-propoxy or -butoxy, methylmercapto or ethylmercapto, lower alkanoyloxy, e.g. acetoxy, halogeno, e.g. fluoro, chloro or bromo, trifluoromethyl, nitro, amino, preferably di-lower alkylamino, e.g. dimethylamino or diethylamino, or acyl, such as lower alkanoyl or lower alkylsulfonyl, e.g. acetyl, propionyl, pivaloyl, methyl- or ethylsulfonyl. More particularly the radicals $Ph_1$ and $Ph_2$ represent $R_4$-1,2-phenylene, wherein $R_4$ is hydrogen, lower alkyl, hydroxy, lower alkoxy, halogeno, trifluoromethyl, nitro, amino or di-lower alkylamino. The term "lower," referred to above and hereinafter in connection with organic radicals or compounds respectively, defines such with up to 7, preferably up to 4, carbon atoms.

The lower alkylene radical alk is preferably methylene, but also 1,1- or 1,2-ethylene, 1,1- 1,2- 2,2- or 1,3-propylene, 1,1-, 1,2-, 1,3-, 2,3-, or 1,4-butylene. A lower aralkylene radical alk is preferably H-$Ph_1$-lower alkylene, especially phenylmethylene, but also one of the other alkylene radicals previously mentioned, but substituted at any chain carbon atom by a phenyl radical, e.g. a H-$Ph_1$ radical.

The amino group Am is a primary, preferably a secondary or tertiary amino group containing advantageously one or two radicals of aliphatic or one of aromatic nature. Such amino groups are, for example, mono- or di-lower alkylamino, e.g. methylamino, ethylamino, i-butylamino, dimethylamino, N - methyl-N-ethylamino, diethylamino, di-n- or i-propylamino or di-n-butylamino; 3 to 7 ring-membered cycloalkylamino, cycloalkyl-lower alkylamino, di-lower alkylamino -lower alkylamino, H-$Ph_1$-lower alkylamino or H-$Ph_1$-amino and the tertiary N-lower alkyl derivatives thereof, e.g. cyclopropylamino, cyclopentylamino, cyclohexylamino, cyclopropylmethylamino, 2-dimethylamino-ethylamino, benzylamino, 2-phenethylamino or phenylamino and the tert. N-(methyl, ethyl, n- or i-propyl or butyl)-derivatives thereof, mono- or bicyclic lower alkyleneimino or alkenyleneimino, e.g. ethyleneimino, pyrrolidino, pyrrolino, piperidino, 1,4-pentyleneimino, 2,5- or 1,6-hexyleneimino or 2,6-heptyleneimino; 2-aza-2-bicyclo[2,2,1]heptyl, 2-aza - 2 - bicyclo-[2,2,2] or [3,2,1]octyl, 3-aza-3-bicyclo[3,2,1] or [3,3,0] octyl, 2-aza-2-bicyclo[3,2,2] or [3,3,1]nonyl, 3-aza-3-bicyclo[3,2,2] or [3,3,1]nonyl, 2-aza-2-, 3-aza-3, 7-aza-7- or 8-aza-8-bicyclo[4,3,0]nonyl or 2-aza-2- or 3-aza-3-bicyclo[4,4,0]decyl, or monocyclic monoaza-, -oxa or -thia-lower alkyleneimino or N-(lower alkyl, hydroxylower alkyl, H-$Ph_1$-lower alkyl or H-$Ph_1$)-mono-aza-lower alkyleneimino, wherein 2 het eroatoms are separated by at least 2-carbon atoms, e.g. piperazino, 4-(methyl, ethyl, 2-hydroxyethyl, benzyl or phenyl)-piperazino, 3-aza-1,6-hexyleneimino, 3-(methyl or ethyl)-3-aza-1,6-hexyleneimino, 4-aza-1,7-heptyleneimino or 4-(methyl or ethyl)-4-aza-1,7-heptyleneimino, morpholino, 3,5-dimethyl-morpholino or thiamorpholino.

An aliphatic radical R, $R_1$ and $R_2$ is, for example, lower alkyl, e.g. that mentioned above, or lower alkenyl, e.g. vinyl or allyl, which radicals may contain functional groups, such as free, etherified or esterified hydroxy, prim., sec. or tert. amino and/or oxo, e.g. (hydroxy, lower alkoxy, halogeno, Am and/or oxo)-lower alkyl, such as (hydroxy, methoxy, ethoxy, chloro or dimethylamino)-methyl, formyl, carboxy or carbo-lower alkoxy, 1- or 2-(hydroxy, methoxy, ethoxy, chloro, dimethylamino, carboxy or carbomethoxy)-ethyl or -propyl, lower alkanoyl, e.g. acetyl or pivaloyl.

An araliphatic or aromatic radical R is, for example, $HPh_1$-lower alkyl, -alkanoyl or -hydroxyalkyl or $HPh_1$ respectively, e.g. benzyl, 1- or 2-phenethyl, benzoyl, phenylacetyl or α-hydroxybenzyl; phenyl, tolyl, anisyl, halophenyl, nitrophenyl, aminophenyl, acetylphenyl or benzoyl.

R preferably represents hydrogen, halogeno, lower alkyl, hydroxy-lower alkyl, lower alkoxy-lower alkyl, halogeno-lower alkyl, Am-lower alkyl, carboxy, carbo-lower alkoxy, $R_4$-phenyl-lower alkyl or $R_4$-phenyl, in which $R_4$ has been defined above. Each of $R_1$ and $R_2$ preferably represents hydrogen, lower alkoxy, halogeno, lower alkyl, hydroxy-lower alkyl, halogeno-lower alkyl, above all trifluoromethyl, carboxy or carbo-lower alkoxy.

Acyl derivatives of the primary or secondary amino compounds of Formula I are preferably those of aliphatic or araliphatic carboxylic or sulfonic acids, such as lower alkanoic, lower alkanesulfonic, $R_4$-phenyl-lower alkanoic or $R_4$-benzenesulfonic acids, e.g. acetic, propionic, pivalic or $R_4$-benzenesulfonic acids, e.g. acetic, propionic, pivalic, methanesulfonic, ethanesulfonic, benzoic, phenylacetic or p-toluenesulfonic acid.

Quaternaries and salts of the compounds of Formula I are preferably lower alkyl or $R_4$-phenyl-lower alkyl quaternaries and acid addition salts.

The compounds of the invention exhibit valuable pharmacological properties, for example, stimulating and amphetamine potentiating effects. This can be demonstrated in animal tests, using advantageously mammals, such as mice and rats, as test objects. The compounds of the invention can be applied to the animals orally, preferably subcutaneously or intraperitoneally, e.g. in the form of aqueous solutions or suspensions. The dosage may range between about 0.1 and 75 mg./kg./day, preferably between about 1 and 50 mg./kg./day, advantageously between about 10 and 25 mg./kg./day. The stimulating effect is routinely tested in the mice jiggle test system, where the spontaneous movements of the animals are recorded. The amphetamine test is performed according to P. Carlton, Psychopharmacologia 1961, vol. II, p. 364, with about 8 month old male rats, which are trained to press a bar every 30 seconds, in order to avoid an electric shock applied through the floor grid. In case the animals receive 0.25 mg./kg./day of amphetamine, their performing rate for avoiding said shocks during a test period of about 2½ hours is higher than that of placebo (saline) treated animals. In case the animals receive the compounds of the invention in the above-mentioned doses and about 45 minutes later the amphetamine, their rate of avoidance is highest, as compared with that of animals receiving (a) saline alone, (b) saline and amphetamine or (c) the compounds of the invention and saline. Accordingly, the compounds of the invention are useful antidepressants in the treatment or management of exo- or endogenous depressions, but also useful intermediates in the preparation of other valuable products, especially of pharmacologically active compounds, e.g. those of copending application Ser. No. 779,257 filed Nov. 26, 1968.

Particularly useful are the compounds of Formula I, in which each of $Ph_1$ and $Ph_2$ is $R_4$-1,2-phenylene, alk is lower alkylene, Am is amino, mono- or di-lower alkylamino, N-lower alkyl-N-di-lower alkylamino-lower alkylamino, monocyclic lower alkylene-imino, lower alkenyleneimino or monoaza-, -oxa- or -thia-lower alkyleneimino wherein two heteroatoms are separated by at least two carbon atoms, R is hydrogen, halogeno, lower alkyl, hydroxy-lower alkyl, Am-lower alkyl, carboxy, carbo-lower alkoxy, $R_4$-phenyl-lower alkyl or $R_4$-phenyl, each of $R_1$ and $R_2$ is hydrogen, lower alkoxy, halogeno, lower alkyl, hydroxy-lower alkyl, trifluoromethyl, carboxy or carbo-lower alkoxy and $R_4$ is hydrogen, lower alkyl, hydroxy, lower alkoxy, halogeno, trifluoromethyl, nitro, amino or di-lower alkylamino, the N-oxides, lower alkyl quaternaries and acid addition salts thereof.

Preferred compounds of the invention are those of Formula II

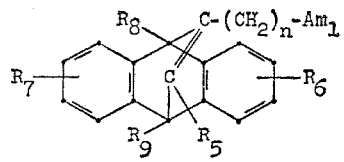

in which $Am_1$ is amino, mono- or di-lower alkylamino, monocyclic lower alkyleneimino or monoaza-, -oxa- or -thia-lower alkyleneimino, $R_5$ is hydrogen, chloro, hydroxymethyl, carboxy, carbomethoxy, carbethoxy, phenyl, tolyl, anisyl, chlorophenyl or nitrophenyl, each of $R_6$ and $R_7$ is hydrogen, methyl, methoxy, chloro or nitro, each of $R_8$ and $R_9$ is hydrogen, methoxy, chloro, methyl, hydroxymethyl, carboxy, carbomethoxy or carbethoxy and n is the integer 1, 2 or 3 and therapeutically acceptable acid addition salts thereof.

Especially valuable are the compounds of Formula II, in which $Am_1$ is dimethylamino, $R_5$ is hydrogen, hydroxymethyl or phenyl, each of $R_6$, $R_7$, $R_8$ and $R_9$ is hydrogen and n is the integer 1, as well as the compounds of Formula II, in which $Am_1$ is also amino, methylamino, diethylamino or pyrrolidino, n is also the integer 2 and $R_5$ to $R_9$ have the meaning given in this paragraph, as well as compounds of Formula II, in which $Am_1$ is also ethylamino, piperidino or 4-methylpiperazino, n is also the integer 3, $R_5$ and $R_6$ is also chlorine and $R_7$ to $R_9$ are hydrogen atoms or therapeutically acceptable acid addition salts of these compounds.

Outstanding is the 11-dimethylaminomethyl-9,10-ethenoanthracene or a therapeutically acceptable acid addition salt thereof, which compounds also exhibit anti-anxiety effects. This can be demonstrated in animal tests, using preferably monkeys, e.g. squirrel or rhesus monkeys, as test objects. At the above described dosage levels, preferably between about 1 and 25 mg./kg./day orally, said compounds reduce acquired fear or anxiety associated with the conflict situation produced by an electric foot shock. For example, according to an avoidance schedule, the monkey must press a lever within a certain time interval to avoid the onset of the shock. Each lever press postpones the shock for 20 seconds and if the monkey fails to press the lever, 0.5 second shocks are delivered at 20 second intervals, unless the animal again presses the lever. Another schedule requires the animal to press the lever 15 times within 20 seconds in the presence of either of two stimuli to obtain a food reinforcement. During the first component, which is signaled by a neutral stimulus, i.e. a steady white light over the lever, the animal receives a food reinforcement but no shock at the end of the 15th response. In the second or anxiety producing component, signalled by blinking lights and a tone, the animal again has to make 15 lever pressing responses to obtain food but, in addition, the animal is presented with a 10% probability of being shocked on the 15th response. This probability of shock produces inhibition of on-going behaviors, i.e. the attempt to obtain food during the presentation of blinking lights and a tone. Said compounds of the invention increase the rate of responding during the presentation of the aversive stimulus.

The compounds of this invention are prepared according to methods known per se. For example, they are obtained by:

(a) converting in a compound of the formula

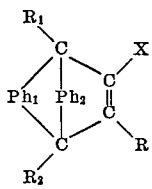

in which X is a substituent capable of being converted into alk-Am, X into said amino-alkyl or -aralkyl group or (b) reacting a 9-R₁-10-R₂-anthracene with the compound R—C≡C—alk-Am and, if desired, converting any resulting compound into another compound of the invention.

The substituent X is, for example, a reactively esterified hydroxyalkyl or -aralkyl group, for example, such derived from a strong mineral acid, particularly a hydrohalic acid, e.g. hydrochloric or hydrobromic acid, a sulfuric or sulfonic acid, such as a lower alkane or benzene sulfonic acid, e.g. methane, ethane or p-toluene sulfonic acid, or a phosphonium-alkyl or -aralkyl group, e.g. a triphenyl phosphonium halide-alkyl or -aralkyl group. Said groups are converted into aminoalkyl by condensation with H-Am or an alkali metal, e.g. sodium salt thereof. X may also be a metal atom, preferably an alkali, e.g. lithium or halomagnesium, and the corresponding metal organic compound reacted with a reactively esterified aminoalkanol or an unsubstituted or N-substituted ethyleneimine.

Another substituent X is, for example, a (nitro, oximino, imino, cyano, carbamoyl, isocyanato or esterified carboxyamino, e.g. carbalkoxyamino)-alkyl, -alkenyl, -alkanoyl or -hydroxyalkyl group, an aminoalkenyl, -alkanoyl or -hydroxyalkyl group, cyano or preferably carbamoyl, e.g. COAm, which radicals can be converted into aminoalkyl by reduction and/or hydrolysis. Said reduction is carried out under mild and careful conditions, so as to prevent saturation of the etheno double bond. The above nitro compounds, nitriles, amides, isocyanates, urethanes or alkanoyl compounds are advantageously reduced with the use of simple or complex light metal hydrides, e.g. boron hydride or alkali metal boron or aluminum hydrides, such as lithium aluminum hydride or sodium boron hydride. In this reduction, the cyano and carbamoyl groups are converted into aminomethyl groups, the isocyanato or esterified carboxyamino groups into methylamino groups and the alkanoyl groups into alkyl or α-hydroxy alkyl groups. Said oximes, Schiff's bases (i.e. iminoalkyl- or aminohydroxyalkyl compounds) or said ω-amino-α-hydroxyalkyl reduction products of the alkanoyl compounds, as well as the nitro compounds and aminoalkenyl compounds, are preferably reduced with nascent hydrogen, such as hydrogen generated electrolytically or by the action of metals on acids or alcohols, e.g. zinc or iron and mineral or alkanoic acids, sodium or aluminum or their amalgams and lower alkanols. Also carefully controlled catalytic reduction may be applied, i.e. hydrogen in the presence of nickel, palladium or platinum catalysts. Isocyanates and urethanes may also be subjected to hydrolysis, e.g. with the use of aqueous mineral acids or alkalies. Reaction (b) is performed in accordance to the Diels-Alder reaction, advantageously at elevated temperature and/or pressure.

The compounds of the invention so obtained can be converted into each other according to methods known per se. For example, resulting primary, secondary or tertiary amines can be reacted with reactive esters of the corresponding alcohols, with lower alkyleneoxides, e.g. ethyleneoxide, or with aldehydes or ketones and reducing agents, e.g. formic acid, its functional derivatives or nascent hydrogen, in order to obtain secondary or tertiary amines, or quaternaries respectively. Resulting primary or secondary amines can also be acylated, for example, with the use of the corresponding acid halides or anhydrides, or acyl derivatives obtained hydrolyzed, e.g. with acids or alkalies, or reduced with simple or complex light metal hydrides. Resulting tertiary amines can be converted into N-oxides or secondary amines, for example by treating them with oxidation or acylating agents, such as hydrogen peroxide or peracids, or acid halides or anhydrides respectively, e.g. aliphatic or aromatic percarboxylic acids, or haloformic acid esters. Furthermore, nitro groups may be introduced into aromatic moieties, e.g. by the action of nitric-sulfuric acid or by pyrolysis of nitrates, advantageously in acidic media, e.g. in trifluoroacetic acid, or nitro groups present therein reduced, e.g. with nascent hydrogen. Resulting hydroxy-compounds, e.g. those of Formula I in which R is hydroxyalkyl, can be esterified and/or etherified, e.g. with the use of acid halides or an hydrides, including thionyl or phosphorus halides or oxyhalides, if desired, followed by the action of lower alkanols or alkali metal alkoxides. Resulting acids can be esterified with the corresponding alcohols in the presence of a strong acid, e.g. hydrochloric, sulfuric, benzene or p-toluene sulfonic acid, or with diazo compounds, and resulting esters hydrolyzed or transesterified in the presence of acidic or alkaline agents, e.g. mineral or complex heavy metal acids or alkali metal carbonates or alcoholates.

A resulting acid can be decarboxylated or converted into its salts according to conventional methods, for example, by pyrolysis in the presence or absence of catalysts, e.g. copper powder, or by treatment with an about stiochiometric amount of a suitable salt-forming reagent, respectively, such as ammonia, an amine or an alkali or alkaline earth metal hydroxide, carbonate or hydrogen carbonate. A salt of this type can be reconverted into the free acid by treatment with an acid, e.g. hydrochloric, sulfuric or acetic acid until the proper pH has been reached. A resulting basic compound can be converted into a corresponding acid addition salt, for example by reacting it with an inorganic or organic acid, such as a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, e.g. hydrochloric, hydrobromic, sulfuric, phosphoric, nitric or perchloric acid, or organic acids, e.g. carboxylic or sulfonic acids, such as formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic and cyclohexylsulfamic acid; methionine, tryptophan, lysine and arginine.

These or other salts, for example, the picrates, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l-tartrates.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. Those starting materials are preferably used, which lead to those compounds of the invention, which are indicated above as the preferred embodiments of the invention.

The starting material used is known or, if new, may be prepared according to methods known per se. For example, the starting material mentioned under item (a) is prepared analogous to reaction (b), i.e. by reacting a 9—$R_1$—10—$R_2$—anthracene with the compound

R—C≡C—X

The adducts obtained can then be converted into each other as described for the final products of the invention. For example, resulting esters can be hydrolyzed or transesterified in the presence of acidic or alkaline agents, e.g. mineral or complex heavy metal acids or alkali metal carbonates or alcoholates, or treated with H-Am. Resulting acids can be converted into their halides by treatment with thionyl or oxalyl halides or phosphorus halides or oxyhalides. Resulting acid halides may be treated with alcohols, ammonia or amines and resulting metal or ammonium salt with aliphatic or araliphatic halides or chlorosulfites, thionyl halides, phosphorus oxide, halides or oxyhalides or other acyl halides, as well as alkali metal cyanides, in order to obtain the corresponding esters, halides, anhydrides, amides or the nitrile respectively. Resulting amides can be hydrolyzed under acidic or alkaline conditions, e.g. with the use of aqueous mineral and/or carboxylic acids or alkali metal hydroxides, also alcoholized or transaminated. A resulting ester, salt or nitrile, containing in α-position at least one hydrogen atom or an 11-halo compound, can be metallized in said α- or 11-position, e.g. with the use of alkali or alkaline earth metals or corresponding organic metal compounds, such as lithium, magnesium, phenyl lithium, triphenylmethyl sodium or sodium amides or alcoholates, and thereupon reacted with ethylene oxide, an ethyleneimine, e.g. N-lower alkyl-ethyleneimine, a reactive ester of a corresponding alcohol, a corresponding functional acid derivative, or an aminoketone, e.g. carbon dioxide, an unsubstituted or correspondingly substituted lower alkyl or alkanoyl halide, or an Am-lower alkanone, to yield the corresponding 11-(substituted alkyl, alkanoyl or α-hydroxyalkyl)-compounds. In case n-butyl lithium is used as metallizing agent, the lithium atom preferably replaces an 11- or 12-hydrogen atom, even in the presence of an 11-halogen atom. In this manner, for example 11-chloro-12-lithium derivatives can be prepared. An 11-halo- or 11-haloalkyl or -alkanoyl compound can also be reacted with potassium cyanide to yield the nitriles. Starting material in which X contains more than one carbon atom can be obtained from the previously-mentioned compounds in which X is halomethyl according to the Wittig reaction to yield said phosphonium compounds. Readily available compounds in which X is lower alkanoyl, e.g. acetyl, can be converted into corresponding amides according to the Willgerodt-Kindler reaction, or may be halogenated and aminated, to yield compounds in which X is Am-lower alkanoyl. The latter compounds can also be obtained by aminomethylation according to Mannich, i.e. reaction of the 11-lower alkanoyl derivatives with formaldehyde or a derivative thereof, e.g. paraformaldehyde, and HAm. The 11-aminoalkanoyl compounds so obtained can be reduced, for example with sodium boron hydride or a Grignard compounds to yield 11-(ω-Am-α-hydroxyalkyl)-compounds. These can be dehydrated, e.g. with sulfuric or phosphoric acid, to yield corresponding aminoalkenyl compounds. Compounds in which X is formyl, can be reacted with nitromethane in order to yield corresponding 2-nitroethenyl compounds. Finally, the isocyanates and urethanes can be obtained from said acid halides and sodium azide, and decomposing the resulting azide according to Curtius, i.e. by pyrolysis in the presence or absence of an alcohol, such as a lower alkanol. The anthracene and acetylene derivatives used in reaction (b) are known or, if new, can be obtained analogous to the methods described for the known compounds. The acetylene derivatives, can be obtained, for example, by aminomethylation according to Mannich, i.e. reaction of acetylenes with formaldehyde and HAm.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75%, preferably about 1 to 50% of the active ingredient.

The following examples are intended to illustrate the invention and are not to be construed as being limitations thereon. Temperatures are given in degrees centigrade, and all parts wherever given are parts by weight.

Example 1

To the suspension of 0.75 g. lithium aluminumhydride in 25 ml. diethyl ether, the solution of 3.8 g. 11-dimethylcarbamoyl-9,10-ethenoanthracene in 60 ml. tetrahydrofuran is added dropwise while stirring and the mixture is refluxed for 5 hours. After cooling, 5 ml. ethyl acetate are added dropwise, followed by 0.75 ml. water, 1.5 ml. 12% aqueous sodium hydroxide and 2.5 ml. water in this order. The mixture is filtered, the filtrate evaporated in vacuo, the residue taken up in the minimum amount of ethanol and the solution acidified with ethanolic hydrochloric acid. The precipitate formed is filtered off, to yield the 11-dimethylaminomethyl-9,10-ethenoanthracene hydrochloride of the formula

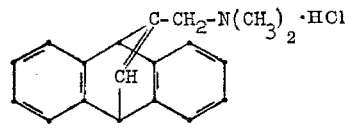

melting at 284–285° (dec.). The corresponding free base melts at 118–120°. The starting material is prepared as follows: The mixture of 40 g. anthracene, 22 g. ethyl propiolate and 150 ml. xylene is refluxed for 7 days. After cooling, it is filtered, the residue washed with acetonitrile and the filtrate evaporated in vacuo. The residue is recrystallized from ethanol, to yield the 11-carbethoxy-9,10-ethenoanthracene melting at 108–110°.

The mixture of 30 g. thereof, 100 ml. 18% aqueous sodium hydroxide and 40 ml. methanol is refluxed for 3 hours and evaporated in vacuo. The residue is dissolved in hot water, the solution filtered and the cold filtrate acidified with 15% aqueous hydrochloric acid. The precipitate formed is filtered off and recrystallized from acetonitrile, to yield the corresponding free acid melting at 250°.

The mixture of 5 g. thereof, and 15 ml. thionyl chloride is allowed to stand at room temperature overnight and is evaporated in vacuo. The residue is recrystallized from benzene-petroleum ether, to yield the corresponding acid chloride melting at 195°.

The mixture of 3.42 g. thereof, 10 ml. 25% aqueous dimethylamine and 10 ml. acetone is stirred at room temperature for 5 hours and allowed to stand overnight at room temperature. It is evaporated in vacuo and the residue recrystallized from benzene-petroleum ether, to yield the 11-dimethylcarbamoyl-9,10-ethenoanthracene melting at 131–133°.

Example 2

The solution of 14.5 g. 11-dimethylcarbamoyl-12-carboxy-9,10-ethenoanthracene in 600 ml. tetrahydrofuran is added dropwise to the stirred suspension of 6.0 g. lithium aluminumhydride in 75 ml. diethyl ether and the mixture is refluxed overnight while stirring. After cooling 6 ml. ethyl acetate, 6 ml. water, 12 ml. 12% aqueous sodium hydroxide and 18 ml. water are added in this order and the precipitate formed filtered off. The filtrate is evaporated, the residue taken up in the minimum amount of ethanol, the solution acidified with hydrochloric acid and the precipitate formed filtered off, to yield the 11-dimethylaminomethyl - 12 - hydroxymethyl-9,10-ethenoanthracene hydrochloride of the formula

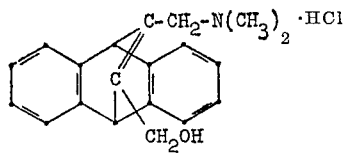

melting at 251–253°.

The starting material is prepared as follows: The mixture of 15 g. anthracene and 15 g. diethyl acetylene-dicarboxylate is heated until the exothermic reaction sets in, whereupon the mixture is cooled. The solid formed is recrystallized from methanol, to yield the 11,12-dicarbethoxy-9,10-ethenoanthracene melting at 155–157°.

The mixture of 21 g. thereof, 120 ml. 18% aqueous sodium hydroxide and 50 ml. methanol is refluxed until a homogeneous solution is obtained. It is cooled, acidified with 15% aqeuus hydrochloric acid, the precipitate formed filtered off and triturated with benzene, to yield the corresponding acid melting at 244–246°.

The mixture of 13 g. thereof, and 50 ml. aceticanhydride is refluxed for 2½ hours and evaporated in vacuo. The residue is recrystallized from benzene-petroleum ether, to yield the corresponding cyclic anhydride melting at 250°.

The mixture of 5 g. thereof, and 10 ml. 5-molar dimethylamine in ethanol is allowed to stand at room temperature overnight and evaporated in vacuo. The residue is taken up in water, the solution acidified with 5% aqueous hydrochloric acid and the mixture extracted with chloroform. The extract is washed with water, dried, filtered and evaporated. The residue is recrystallized from ethanol and washed with petroleum ether, to yield the 11 - dimethylcarbamoyl - 12-carboxy-9,10-ethenoanthracene melting at 265–267°.

Example 3

The solution of 1.25 g. 11-dimethylcarbamoyl-12-phenyl - 9,10 - ethenoanthracene in 25 ml. tetrahydrofuran is added dropwise to the stirred suspension of 0.25 g. lithium aluminumhydride in diethyl ether and the mixture is refluxed for 8 hours. After cooling, 1 ml. ethylacetate, 0.25 ml. water, 0.5 ml. 12% sodium hydroxide and 0.75 ml. water are added in this order. The precipitate formed is filtered off, the filtrate evaporated in vacuo, the residue taken up in the minimum amount of ethanol and the solution acidified with ethanolic hydrochloric acid. The precipitate formed is filtered off, to yield the 11-dimethylaminomethyl-12-phenyl - 9,10 - ethenoanthracene hydrochloride of the formula

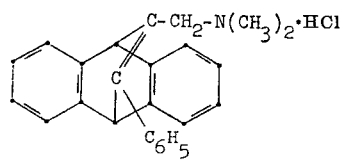

melting at 253–255°.

The starting material is prepared as follows: The mixture of 40 g. anthracene, 39.2 g. ethyl phenylpropiolate and 150 ml. xylene is allowed to stand at room temperature for one month. It is filtered, the filtrate evaporated in vacuo and the residue recrystallized from ethanol, to yield the 11-carbethoxy-12-phenyl-9,10-ethenoanthracene melting at 144–145°.

The mixture of 25 g. thereof, 125 ml. 24% aqueous sodium hydroxide and 50 ml. methanol is refluxed for 2 days. After cooling it is acidified with hydrochloric acid, the precipitate formed filtered off and recrystallized from ethanol, to yield the corresponding free acid melting at 224–227°.

11.0 g. thereof, are dissolved in the minimum amount of methanol and the solution neutralized with 2 N methanolic sodium methoxide. The mixture is evaporated in vacuo, the residue suspended in 200 ml. benzene and the ice cold solution added dropwise to 41 ml. oxalyl chloride at 0–5° while stirring and controlling the gas evolution. The mixture is warmed up to 15° and stirred until no further gas evolution is noticed. To the mixture water is added dropwise, until the gas evolution ceases. Hereupon it is dried, filtered and the filtrate evaporated, to yield the corresponding acid chloride.

The mixture of 4 g. thereof, 20 ml. acetone and 10 ml. 25% aqueous dimethylamine is stirred overnight and evaporated in vacuo. The residue is recrystallized from benzene-petroleum ether, to yield the dimethylcarbamoyl-12-phenyl-9,10-ethenoanthracene melting at 149–151°.

Example 4

Preparation of 10,000 tablets each containing 10.0 mg. of the active ingredient:

| Formula: | G. |
|---|---|
| 11-dimethylaminomethyl - 9,10 - ethenoanthracene hydrochloride | 100.00 |
| Lactose | 1,157.00 |
| Corn starch | 75.00 |
| Polyethylene glycol 6,000 | 75.00 |
| Talcum powder | 75.00 |
| Magnesium stearate | 18.00 |
| Purified water q.s. | |

Procedure: All the powders are passed through a screen with openings of 0.6 mm. Then the drug substance, lactose, talcum, magnesium stearate and half of the starch are mixed in a suitable mixer. The other half of the starch is suspended in 40 ml. water and the suspension added to the boiling solution of the polyethylene glycol in 150 ml.

water. The paste formed is added to the powders which are granulated, if necessary, with an additional amount of water. The granulate is dried overnight at 35°, broken on a screen with 1.2 mm. openings and compressed into tablets using concave punches with 6.4 mm. diameter, uppers bisected.

Example 5

According to the method described in Examples 1–3, the following compounds are prepared from equivalent amounts of the corresponding starting materials:

(a) 2 - chloro-9-hydroxymethyl-11-pyrrolidinomethyl-9,10-ethenoanthracene hydrchloride from ethyl propiolate and 2-chloroanthracene-9-aldehyde with the use of pyrrolidine instead of dimethylamine. The aldehyde is prepared as follows: The mixture of 3 g. 2-chloro-anthracene, 3.8 g. N-methyl-formamide, 4.5 g. phosphorus oxychloride and 4 ml. 1,3-dichloro-benzene is stirred for 2 hours at 95°. Thereupon 20 g. sodium acetate in 35 ml. water are added, the precipitate formed filtered off and washed with hot ethanol. The filtrate is concentrated, the precipitate formed separated and recrystallized from glacial acetic acid, to yield the 2-chloro-anthracene-9-aldehyde melting at 149°.

(b) 1,5-dichloro-10,11-di-(hydroxymethyl) - 12 - morpholinomethyl-9,10-ethenoanthracene hydrochloride from diethyl acetylene - dicarboxylate and 1,5 - dichloro-anthracene-9-carboxylic acid, with the use of morpholine.

(c) 9-hydroxymethyl-10-chloro - 11 - (4-methylpiperazino)-methyl - 9,10 - ethano-anthracene dihydrochloride from ethyl propiolate and 9-hydroxymethyl-10-chloroanthracene, with the use of 1-methylpiperazine. Said anthracene derivative is prepared as follows: The mixture of 2.1 g. 10-chloro-anthracene-9-aldehyde, 0.6 g. sodium borohydride and 20 ml. ethanol is stirred at room temperature for 2 hours. Hereupon 15 ml. water are added, the precipitate formed filtered off and recrystallized from methanol-dimethyl-formamide, to yield the 9-hydroxymethyl-10-chloro-anthracene melting at 204°. Analogously the 2-chloro-9-hydroxymethyl-anthracene is prepared, M.P. 143°.

Example 6

1 g. 11 - dimethylaminomethyl-9,10-etheno-anthracene is added to the mixture of 7.7 ml. concentrated sulfuric acid and 0.8 ml. concentrated nitric acid while stirring, and the mixture is heated to about 60° for 1 hour. It is poured onto ice, the whole made basic with concentrated aqueous sodium hydroxide and extracted with methylene chloride. The extract is dried, filtered and evaporated, to yield the 1,3,6,8-tetranitro - 11 - dimethylaminomethyl-9,10-ethenoanthracene of the formula

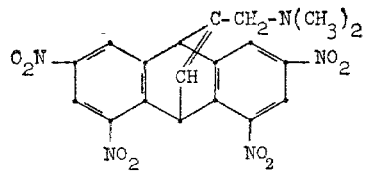

Example 7

The mixture of 16 g. anthracene, 5 g. propargylamine and 50 ml. toluene is heated in a sealed tube to about 215° for 15 hours. It is filtered, the filtrate washed with water and extracted with N hydrochloric acid. The extract is concentrated, the precipitate formed filtered off, taken up in water and the solution made basic with aqueous ammonia. The precipitate formed is filtered off, to yield the 11-aminomethyl - 9,10 - ethenoanthracene of the formula

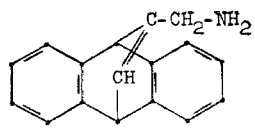

melting at 161–163°. It is taken up in the minimum amount of ethanol and the solution acidified with ethanolic hydrochloric acid, to yield the corresponding hydrochloride melting at 216–218°.

Example 8

The mixture of 1 g. 11-dimethylaminomethyl-9,10-ethenoanthracene, 1 ml. methyl sulfate and 25 ml. acetone is refluxed for 2 hours. After cooling, it is filtered and the residue recrystallized from ethanol-ethyl acetate, to yield the 11-trimethyl-ammoniummethyl - 9,10 - ethenoanthracene methosulfate of the formula

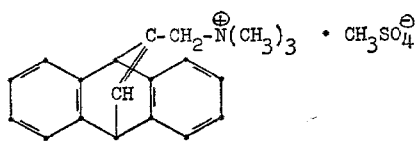

melting at 190°.

Example 9

To the solution of 1 g. 11-dimethylaminomethyl-9,10-ethenoanthracene in 10 ml. methylene chloride, the solution of 1.2 g. 3-chloro-perbenzoic acid in 25 ml. methylene chloride is added dropwise while stirring at room temperature. After stirring for 2 hours, a negative starch-iodide test was obtained and 0.25 g. more of the peracid in 5 ml. methylene chloride are added. The mixture is stirred overnight at room temperature, washed with aqueous sodium bicarbonate, dried and evaporated in vacuo. The residue is taken up in the minimum amount of isopropanol, the solution acidified with isopropanolic hydrobromic acid and the precipitate formed recrystallized from isopropanol, to yield the 11-dimethylaminomethyl-9,10-ethenoanthracene-N-oxide hydrobromide of the formula

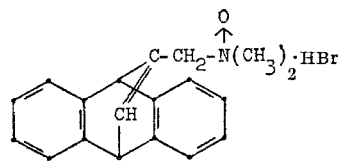

melting at 195–197°.

Example 10

To 10 g. 11-hydroxymethyl-9,10-ethenoanthracene, 30 ml. thionyl chloride are added cautiously and the mixture allowed to stand at room temperature for 1 hour. It is evaporated in vacuo, the residue combined with 50 ml. 3.45 N methanolic methylamine and the mixture stirred at room temperature for 2 days. It is filtered, the filtrate evaporated in vacuo, the residue taken up in aqueous ammonia and the mixture extracted with diethyl ether. The extract is washed with water, dried, evaporated, and the residue taken up in the minimum amount of ethanol. The solution is slightly acidified with ethanolic maleic acid, the precipitate formed filtered off and taken up in aqueous ammonia. The mixture is again extracted with diethyl ether, the extract washed with water, dried and acidified with isopropanolic hydrobromic acid. The precipitate formed is filtered off and washed with isopropanol, to yield the 11-methylaminomethyl-9,10-ethenoanthracene hydrobromide of the formula

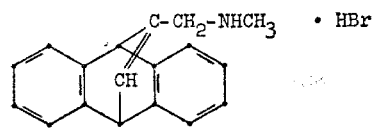

melting at 235° with decomposition.

The starting material is prepared as follows: The mixture of 200 g. anthracene, 80 g. propargyl alcohol, 2.4 g. hydroquinone and 560 ml. toluene is heated in an autoclave to about 210° for 15 hours. It is filtered, the filtrate evaporated in vacuo, the residue dissolved in 250 ml. warm methanol and the solution chilled for 2 hours. The mixture is filtered, the filtrate concentrated until crystallization occurs, the concentrate filtered after cooling and the residue recrystallized from isopropanol, to yield the 11-hydroxymethyl-9,10-ethenoanthracene melting at 121–124°.

Example 11

The mixture of 5 g. 11-(2-bromoethyl)-9,10-ethenoanthracene, 50 ml. benzene and 60 ml. 5 N ethanolic dimethylamine is allowed to stand at room temperature for 1 week. It is evaporated in vacuo, the residue taken up in diethyl ether, the solution extracted with 5% hydrochloric acid and the aqueous layer made basic with ammonia. It is extracted with diethyl ether, the extract dried, filtered and evaporated. The residue is taken up in the minimum amount of isopropanol and the solution slightly acidified with isopropanolic hydrogen bromide, to yield the 11-(2-dimethylaminoethyl)-9,10-ethenoanthracene hydrobromide of the formula

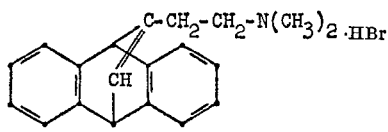

melting at 245–246°.

The starting material is prepared as follows: The mixture of 200 g. anthracene, 96 g. 3-butanol, 2.5 g. hydroquinone and 600 ml. toluene is heated in an autoclave to about 210° for 15 hours. It is filtered, the residue washed with acetonitrile and the filtrate evaporated in vacuo. The residue is taken up in the minimum amount of methanol at room temperature and the mixture chilled in the refrigerator. It is filtered, the filtrate evaporated in vacuo, the residue taken up in the minimum amount of chloroform-ethyl acetate (9:1, the solution chromatographed on silica and the eluate obtained with ethyl acetate evaporated, to yield the 11-(2-hydroxyethyl)-9,10-ethenoanthracene having an $R_f$ of 5.5 in said system.

To the solution of 2.8 g. thereof in 100 ml. diethyl ether, 0.7 ml. phosphorus tribromide are added during 10 minutes at —70° while stirring, and stirring is continued at room temperature for 5 hours. The mixture is carefully combined with water, the precipitate formed filtered off and recrystallized from acetone, to yield the 11-(2-bromoethyl) - 9,10 - ethenoanthracene melting at 180°.

Example 12

To the solution of 4.3 g. 11-bromomethyl-9,10-ethenoanthracene in 18 ml. benzene, 4.8 g. diethylamine are added while stirring, the mixture refluxed for 1 hour, diluted with benzene and refluxed overnight. It is evaporated in vacuo, the residue taken up in 250 ml. warm 0.8 N hydrochloric acid and the precipitate formed while standing in the cold filtered off. 2.45 g. thereof are taken up in 150 ml. water, the solution treated with charcoal, filtered and concentrated, to yield the 11-diethylaminomethyl-9,10-ethenoanthracene hydrochloride of the formula

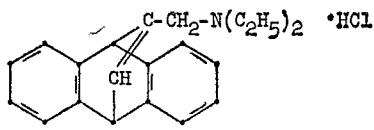

melting at 245–249°.

The starting material is prepared as follows: To the solution of 5 g. 11-hydroxymethyl-9,10-ethenoanthracene in 155 ml. diethyl ether, 0.65 ml. phosphorus tribromide are added during 15 minutes while stirring at about —75° and stirring is continued overnight at room temperature. The mixture is washed with ice water and saturated aqueous sodium carbonate, dried, filtered, evaporated in vacuo and the residue recrystallized from aqueous ethanol, to yield the 11-bromomethyl-9,10-ethenoanthracene melting at 141–144°.

Example 13

To the suspension of 1.2 g. lithium aluminum hydride in 20 ml. diethyl ether, the solution of 4.7 g. 11-pyrrolidinocarbonyl-9,10-ethenoanthracene in 120 ml. tetrahydrofuran is added dropwise while stirring and the mixture is refluxed for 5 hours. After cooling, 1.2 ml. water, 2.4 ml. 12% aqueous sodium hydroxide and 3.8 ml. water are added in this order, the mixture filtered and the filtrate evaporated in vacuo. The residue is taken up in the minimum amount of ethanol, the solution acidified with ethanolic hydrochloric acid and the precipitate recrystallized from ethanol-diethyl ether, to yield the 11-pyrrolidinomethyl-9,10 - ethenoanthracene hydrochloride of the formula

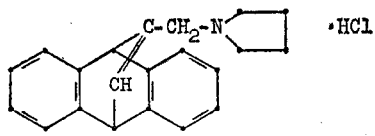

melting above 270°.

The starting material is prepared according to the method shown in Example 1. It melts, after recrystallization from benzene-petroleum ether, at 166–168°.

Example 14

To the solution of 1.7 g. 11-(α-bromobenzyl)-9,10-ethenoanthracene in 50 ml. tetrahydrofuran, the solution of 1.9 g. dimethylamine in 50 ml. ethanol is added slowly while stirring and the mixture is allowed to stand at room temperature for 1 week. It is evaporated in vacuo, the residue is triturated with 5% hydrochloric acid and taken up in 12% aqueous sodium hydroxide. The mixture is extracted with diethyl ether, the extract acidified with 5% aqueous hydrobromic acid and concentrated. The precipitate formed is filtered off and washed with diethyl ether, to yield the 11 - (α-dimethylaminobenzyl)-9,10-ethenoanthracene hydrobromide of the formula

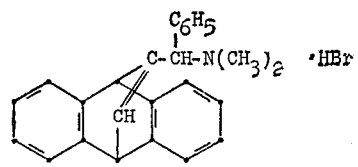

melting at 238–240°.

The starting material is prepared as follows: The mixture of 15 g. anthracene, 14.2 g. 1-phenyl-2-propynol and 50 ml. toluene is heated in a sealed tube to about 210° for 15 hours. It is filtered, the residue washed with acetonitrile, the filtrate evaporated in vacuo and the residue recrystallized from isopropanol, to yield the 11-(α-hydroxybenzyl)-9,10-ethenoanthracene melting at 210–212°.

To the solution of 4 g. thereof in 100 ml. diethyl ether, 0.7 ml. phosphorus tribromide are added at —10° while stirring and stirring is continued overnight at room temperature. The resulting mixture is washed with ice water and saturated aqueous sodium carbonate, dried, filtered, evaporated in vacuo and the residue recrystallized from acetone, to yield the 11-(α-bromobenzyl)-9,10-ethenoanthracene melting at 180°.

Example 15

To the solution of 10 g. 11-(9,10-ethenoanthracenyl) lithium in the minimum amount of tetrahydrofuran, the saturated solution of 2.5 g. N-methyl-ethyleneimine in tetrahydrofuran is added dropwise while stirring at room temperature. The mixture is refluxed overnight and, after cooling, 5 ml. aqueous ammonium chloride are added and the whole is evaporated in vacuo. The residue is taken up in N-hydrochloric acid, the mixture washed with diethyl ether, the aqueous phase made basic with aqueous sodium hydroxide, extracted with diethyl ether, the extract washed with water, dried and evaporated. The residue is taken up in the minimum amount of isopropanol and the solution acidified with isopropanolic hydrogen bromide, to yield the 11-(2-methylaminoethyl)-9,10-ethenoanthracene hydrobromide of the formula

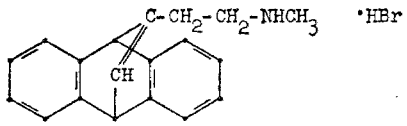

showing in the I.R. spectrum bands at 730, 2425, 2745 and 3400 cm.$^{-1}$.

The starting material is prepared as follows: To the solution of 10 g. 11-chloro-9,10-ethenoanthracene in 100 ml. tetrahydrofuran, 21 ml. 2 N n-butyl lithium in hexane are added dropwise while stirring under nitrogen. The mixture is allowed to stand for 6 hours at room temperature and concentrated in vacuo. It is filtered under nitrogen and the filtrate evaporated, to yield the 11-(9,10-ethenoanthracenyl) lithium which is used without further purification.

Instead of filtering and concentrating the above reaction mixture, it can be combined as such with the solution of 1.8 g. ethylene oxide in 10 ml. tetrahydrofuran. After stirring for 2 hours, 30 ml. 10% aqueous ammonium chloride are added, the mixture evaporated in vacuo and the residue taken up in diethyl ether. The solution is dried, filtered and evaporated, to yield the 11-(2-hydroxyethyl)-9,10-ethenoanthracene which is identical with the material obtained according to Example 11.

Example 16

The mixture of 10 g. 5-dimethylamino-2-pentynoic acid hydrochloride, 10 g. anthracene and 100 ml. dimethylformamide is stirred at about 140° for 10 days. After cooling, it is poured into water, the mixture neutralized with ammonia, the precipitate formed filtered off and recrystallized from ethanol, to yield the 11-(2-dimethylaminoethyl) - 12 - carboxy-9,10-ethenoanthracene of the formula

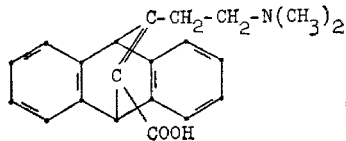

5 g. thereof are taken up in 50 ml. quinoline, 1 g. copper powder is added and the mixture heated to about 185–190° until the evolution of carbon dioxide ceases. The mixture is subjected to steam distillation, the distillate extracted with diethyl ether, the extract dried, filtered and evaporated. The residue is taken up in the minimum amount of isopropanol and the solution acidified with isopropanolic hydrogen bromide, to yield the 11-(2-dimethylaminoethyl)-9,10-ethenoanthracene hydrobromide melting at 245–246°; it is identical with the compound obtained according to Example 11.

The starting material is prepared as follows: The Grignard reagent made from 12.4 g. ethylbromide in 50 ml. diethyl ether is added portionwise to the mixture of 20 g. N-3-butynyldimethylamine and 100 ml. diethyl ether while stirring. After standing for 12 hours, the mixture is gassed with carbon dioxide while stirring and cooling until a sample yields a negative Gilman's test for organo-metallic compounds. It is carefully combined with 100 ml. 10% aqueous ammonium chloride and the organic layer extracted with N-hydrochloric acid. The extract is evaporated in vacuo, to yield the 5-dimethylamino-2-pentynoic acid hydrochloride, which is used without further purification.

Example 17

The solution of 5 g. 11-(1-hydroxy-2-dimethylaminoethyl)-9,10-ethenoanthracene hydrochloride in 200 ml. ethanol is hydrogenated over 0.5 g. 10% palladium on charcoal at 3.4 at until the theoretical amount of hydrogen is absorbed. It is filtered, the filtrate evaporated in vacuo, the residue taken up in the minimum amount of isopropanol, and the solution acidified with isopropanolic hydrogen bromide, to yield the 11-(2-dimethylaminoethyl) - 9,10 - ethenoanthracene hydrobromide which is identical with the product obtained according to Example 11.

The starting material is prepared as follows: The mixture of 44 g. anthracene, 15.3 g. 3-butynone and 150 ml. xylene is refluxed for 1 week. It is cooled, filtered, and the residue washed with hot acetonitrile. The acetonitrile solution is evaporated in vacuo and the residue recrystallized from ethanol, to yield the 11-acetyl-9,10-ethenoanthracene melting at 250°.

The mixture of 5 g. thereof, 20 ml. carbon tetrachloride, 3.7 g. N-bromosuccinamide and 0.1 g. benzoylperoxide is refluxed until a sample gives no positive starch iodide test. It is filtered and the filtrate evaporated in vacuo, to yield the corresponding 11-bromoacetyl compound.

The mixture of 10 g. thereof, 50 ml. ethyl acetate and 20 ml. 4.5 N dimethylamine in ethyl acetate is heated in a sealed tube for 12 hours. It is evaporated in vacuo, the residue taken up in diethyl ether, the solution washed with water, dried and evaporated, to yield the 11-dimethylaminoacetyl-9,10-ethenoanthracene.

It is taken up in 100 ml. ethanol and 0.5 g. sodium borohydride are added while stirring, and stirring is continued overnight. The mixture is evaporated in vacuo, the residue taken up in diethyl ether, the solution washed with water, dried, gassed with hydrogen chloride and the precipitate formed filtered off, to yield the 11-(1-hydroxy-2-dimethylaminoethyl) - 9,10 - ethenoanthracene hydrochloride.

Example 18

The solution of 5 g. 11-(2-nitro-ethenyl)-9,10-ethenoanthracene in 20 ml. tetrahydrofuran is added dropwise to the stirred mixture of 1 g. lithium aluminum hydride and 100 ml. diethyl ether. The mixture is refluxed for 6 hours, cooled and combined with 1 ml. water, 2 ml. 12% aqueous sodium hydroxide and 3 ml. water, in this order. It is filtered, the filtrate saturated with hydrogen chloride and the precipitate formed recrystallized from isopropanol, to yield the 11-(2-aminoethyl)-9,10-ethenoanthracene hydrochloride of the formula

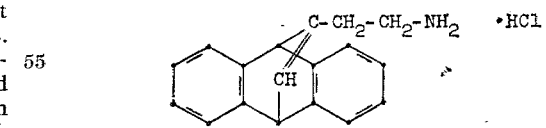

showing in the I.R. spectrum bands at 750, 2590, 2690 and 2720 cm.$^{-1}$.

The starting material is prepared as follows: The mixture of 10 g. 11-hydroxymethyl-9,10-ethenoanthracene, 5 g. activated manganese dioxide and 100 ml. methylene dichloride is stirred for 1 day at room temperature. It is filtered and the filtrate evaporated in vacuo, to yield the 11-(9,10-ethenoanthracenyl)-carboxaldehyde.

To the mixture of 10 g. thereof, 2.7 g. nitromethane and 50 ml. methanol, 9.2 ml. 5 N aqueous sodium hydroxide are added dropwise while stirring and cooling in an ice bath. After stirring for 3 hours at room temperature, the mixture is strongly acidified with 6 N hydrochloric acid while cooling, diluted with water and the precipitate formed filtered off, to yield the 11-(2-nitro ethenyl)-9,10-ethenoanthracene.

Example 19

The solution of 11.7 g. of the 1:1 mixture of the 1- and 4-chloro-11-dimethylcarbamoyl-9,10-ethenoanthracenes in 50 ml. tetrahydrofuran and 25 ml. diethyl ether is added dropwise to the suspension of 4 g. lithium aluminum hydride and 40 ml. diethyl ether while stirring. Hereupon the mixture is refluxed for 5 hours, cooled and 4 ml. water, 8 ml. 12% aqueous sodium hydroxide and 12 ml. water are added in this order. It is filtered, the filtrate evaporated, the residue taken up in isopropanol and the solution acidified with isopropanolic hydrobromic acid, to yield the 1:1 mixture of the 1- and 4-chloro-11-dimethylaminomethyl-9,10-ethenoanthracenes of the formulae

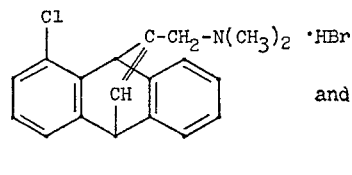 and 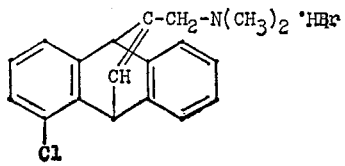

melting at 255–259°.

Said mixture is separated by chromatography using hexane:benzene:diethylamine (85:5:10) as the mobile phase and silica gel as the stationary phase; the $R_f$-values are 6.0 and 7.0 respectively.

In the analogous manner, the 1:1 mixture of the 2- and 3-chloro-11-dimethylaminomethyl-9,10-ethenoanthracenes is obtained, M.P. 243–244°. It is separated in the same system and its components have $R_f$-values of 6.0 and 6.5 respectively.

The starting material is prepared as follows: The mixture of 25.5 g. 1-chloroanthracene, 11.8 g. ethyl propiolate and 130 ml. xylene is refluxed for 1 week and evaporated in vacuo. The residue is taken up in 40 ml. methanol, 100 ml. 18% aqueous sodium hydroxide are added and the mixture refluxed for 3 hours. It is cooled, acidified with hydrochloric acid, the precipitate formed filtered off and recrystallized from aqueous ethanol, to yield the about 1:1 mixture of 1- and 4-chloro-11-carboxy-9,10-ethenoanthracene melting at 200–202°. The analogously obtained mixture of the 2- and 3-isomers melts at 214–217°.

The mixture of 12.8 g. of said acids and 100 ml. thionyl chloride is refluxed for 90 minutes and evaporated in vacuo. The residue is taken up in benzene, and dimethylamine bubbled through the solution while cooling in an ice bath. When it remains basic, it is evaporated in vacuo, the residue taken up in diethyl ether, the solution washed with 5% hydrochloric acid, saturated aqueous sodium bicarbonate and water, dried, filtered and evaporated, to yield the 1:1 mixture of either the 1- and 4-, or 2- and 3-chloro-11-dimethylcarbamoyl-9,10-ethenoanthracenes.

Example 20

Preparation of 10,000 tablets each containing 50.0 mg. of the active ingredient:

Formula:

| | G. |
|---|---|
| 11-(2-dimethylaminoethyl) - 9,10 - etheno-anthracene hydrobromide | 500.00 |
| Lactose | 1,706.00 |
| Cornstarch | 90.00 |
| Polyethylene glycol 6,000 | 90.00 |
| Talcum powder | 90.00 |
| Magnesium stearate | 24.00 |
| Purified water, q.s. | |

Procedure: All the powders are passed through a screen with openings of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

Example 21

The mixture of 11.4 g. 11-(1-bromoethyl)-9,10-ethenoanthracene, 25 ml. benzene and 21 ml. 5.1 N dimethylamine in ethanol is heated in a sealed tube in a boiling water bath overnight. After cooling, it is made strongly basic with aqueous ammonia, evaporated and the residue dissolved in diethyl ether. The solution is extracted with 15% aqueous hydrochloric acid, the extract made basic with aqueous ammonia and the mixture extracted with diethyl ether. The extract is washed with water, dried and evaporated. The residue is triturated with ethanolic hydrochloric acid and recrystallized from ethanol, to yield the 11-(1-dimethylaminoethyl) - 9,10 - etheno-anthracene hydrochloride of the formula melting at 270–272°.

The starting material is prepared as follows: The solution of 30 g. 11-carboxy-9,10-etheno-anthracene in the minimum amount of tetrahydrofuran is added dropwise with stirring to the mixture prepared from 7 g. lithium in 300 ml. diethyl ether and the solution of 71 g. methyl iodide in 130 ml. diethyl ether, kept under nitrogen. The reaction mixture is refluxed 3 hours, cooled to room temperature and filtered through glass wool to remove unreacted lithium. The filtrate is poured into ice water and extracted with a large volume of diethyl ether. The extract is washed with aqueous sodium bicarbonate and water, dried and evaporated. The residue is recrystallized from ethanol, to yield the 11-acetyl-9,10-etheno-anthracene melting at 180–182°.

The solution of 12 g. thereof in the minimum amount of diethyl ether is added dropwise to the stirred suspension of 3 g. lithium aluminum hydride in 50 ml. diethyl ether. The reaction mixture is stirred at room temperature for 1½ hours and decomposed by the addition of a few drops ethyl acetate, followed by 30 ml. water, 6 ml. 12% aqueous sodium hydroxide and 9 ml. water. It is filtered and the filtrate evaporated in vacuo, to yield the 11-(1-hydroxyethyl) - 9,10 - etheno-anthracene. The solution of 12 g. thereof in 200 ml. diethyl ether is cooled to —70° and 3.14 g. phosphorus tribromide are added dropwise during 30 minutes while stirring. The reaction mixture is allowed to warm up to room temperature and stirred for 6 hours. Hereupon ice water is cautiously added. The organic layer is washed twice with aqueous sodium bicarbonate and once with water, dried and evaporated, to yield the 11-(1-bromoethyl)-9,10-etheno-anthacene.

Example 22

The mixture of 1 g. 11-(3-tosyloxypropyl)-9,10-ethenoanthracene and 5 ml. of 0.3 molar dimethylamine in ethanol is heated in a sealed tube for 12 hours to 100°. It is evaporated, the residue taken up in aqueous ammonia, the mixture extracted with diethyl ether and the extract shaken with 5% aqueous hydrochloric acid. The aqueous solution is made basic with aqueous ammonia and extracted with diethyl ether. The extract is dried, filtered and evaporated, to yield the 11-(3-dimethylaminopropyl)-9,10-etheno-anthracene of the formula

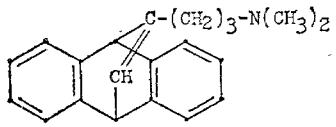

showing in the I.R. spectrum bands of 3069, 3019, 1454, 1148, 748 and 741 cm.$^{-1}$.

The starting material is prepared as follows: The mixture of 15 g. anthracene, 7.1 g. 4-pentynol, 42 ml. toluene and a few crystals hydroquinone is heated in a sealed tube to 210° for 15 hours. It is filtered, the residue washed with acetonitrile, to yield 13 g. unreacted anthracene. The filtrate is chromatographed on silica gel and eluted with chloroform, to yield the 11 - (3 - hydroxypropyl) - 9,10-etheno-anthracene.

The mixture of 1.4 g. thereof, 1.5 g. 4-toluenesulfonyl chloride and 2 ml. pyridine is stirred at room temperature overnight and poured into ice water. The mixture is extracted with methylene chloride, the extract washed with water and 5% hydrochloric acid, dried, filtered and evaporated to yield the 11 - (3 - tosyloxypropyl) - 9,10-etheno-anthracene.

Example 23

The mixture of 31.4 g. 11 - (2 - tosyloxyethyl) - 9,10-etheno-anthracene and 46 ml. 0.23 molar dimethylamine in ethanol is heated in a sealed tube for 12 hours to 100° and evaporated. The residue is taken up in aqueous ammonia, the mixture extracted with diethyl ether, and the extract shaken with 5% hydrochloric acid. The aqueous solution is made basic with ammonia and extracted with diethyl ether. The extract is dried, filtered, evaporated, the residue taken up in the minimum amount of isopropanol and the solution acidified with isopropanolic hydrogen bromide. The precipitate formed is filtered off and recrystallized from methtnol, to yield the 11-(2-dimethyl-aminoethyl)-9,10-etheno-anthracene hydrobromide melting at 242–245°; it is identical with the product obtained according to Example 11 or 17.

In the analogous manner, the isopropanolic solution can be acidified with ethanolic hydrogen chloride and the precipitate formed recrystallized from isopropanol, to yield the corresponding hydrochloride melting at 221–222°.

The starting material is prepared as follows: To the Grignard reagent prepared from 2.0 g. magnesium, 18 g. 11-chloro-9,10-etheno-anthracene, 1 crystal iodine, a few drops methyl iodide and 38 ml. tetrahydrofuran, the solution of 26 ml. ethylene oxide in diethyl ether having a concentration of 0.26 g./ml. is slowly added while stirring and cooling with an ice-salt bath. Hereupon, the mixture is slowly heated and refluxed for 1 hour. It is combined with 40 ml. saturated ammonium chloride, filtered, the residue washed with diethyl ether and the filtrate evaporated in vacuo, to yield the 11-(2-hydroxyethyl)-9,10-etheno-anthracene. To the stirred mixture of 45.2 g. thereof and 270 ml. pyridine, 55.3 g. 4-toluenesulfonyl chloride are added portionwise at room temperature and stirring is continued overnight. It is poured into 300 ml. water, the mixture extracted with methylene chloride, the extract washed with water, 5% hydrochloric acid and water, dried, filtered and evaporated, to yield the 11-(2-tosyloxyethyl)-9,10-ethenoanthracene.

Example 24

To the Grignard reagent prepared from 10 g. 11-chloro-9,10-ethenoanthracene and 1.2 g. magnesium in 20 ml. tetrahydrofuran, 8.8 ml. of a 0.08 molar solution of 2-dimethylaminoethylchloride in toluene is added dropwise while cooling and stirring. Hereupon the mixture is refluxed for 8 hours, cooled and combined with 7.6 ml. saturated aqueous ammonium chloride. It is filtered, the residue washed with diethyl ether and the filtrate evaporated in vacuo. The residue is taken up in 5% hydrochloric acid, the solution washed with diethyl ether, made basic with aqueous ammonia and extracted with diethyl ether. The extract is dried, filtered, evaporated, the residue taken up in the minimum amount of isopropanol and the solution acidified with isopropanolic hydrogen bromide, to yield the 11-(2-dimethylaminoethyl)-9,10-ethenoanthracene hydrobromide melting at 243–245°; it is identical with the product obtained according to Examples 11, 17 or 23.

Example 25

To the solution of 1.4 g. 11-(2-dimethylamino ethyl)-9,10-ethenoanthracene in 15 ml. benzene, the solution of 1.2 g. ethyl chloroformate in 5 ml. benzene is added during 15 minutes at 50° while stirring and the mixture refluxed for 12 hours. It is cooled, diluted with diethyl ether and washed with 5% hydrochloric acid. The organic solution is evaporated in vacuo, the residue taken up in the solution of 1 g. potassium hydroxide in 15 ml. diethylene glycol monoethyl ether and the mixture refluxed for 12 hours. It is diluted with 100 ml. water, extracted with diethyl ether, the extract shaken with N hydrochloric acid and the aqueous layer separated. It is made basic with aqueous ammonia, the mixture extracted with diethyl ether, and the extract dried, filtered and evaporated. The residue is taken up in the minimum amount of n-propanol, the solution acidified with propanolic hydrogen chloride, the precipitate formed filtered off and recrystallized from ethanol, to yield the 11-(2-methylaminoethyl)-9,10-ethenoanthracene hydrochloride melting at 260–261°. The corresponding base is identical with that obtained in Example 15. It can also be converted into the hydrobromide described in said example.

Example 26

To the mixture of 0.67 g. magnesium, 3 ml. tetrahydrofuran, 1 crystal iodine and 1 drop methyl iodide, the solution of 5 g. 11-chloro-9,10-ethenoanthracene in 15 ml. tetrahydrofuran is added dropwise while stirring. After refluxing for 4 hours, the mixture is cooled and the solution of 3.04 g. 3-dimethylamino-propyl chloride in 15 ml. toluene is added dropwise and the mixture refluxed for 10 hours. After cooling, 3.6 ml. saturated aqueous ammonium chloride are added, the mixture filtered and the filtrate evaporated in vacuo. The residue is taken up in diethyl ether, the solution extracted with 5% aqueous hydrochloric acid, the aqueous layer made basic with ammonia and extracted with diethyl ether. The extract is dried, filtered and evaporated, to yield the 11-(3-dimethylaminopropyl)-9,10-ethenoanthracene as an oil, which I.R. data are identical with those of the compound obtained according to Example 22.

The starting material is described in J. Am. Chem. Soc. 87, 5679.

Example 27

To the Grignard compound prepared from 10 g. 11-chloro-9,10-ethenoanthracene and 1.35 g. magnesium in 30 ml. tetrahydrofuran, the solution of 13.6 ml. 3.5 N 2-dimethylamino-propyl chloride in toluene are added dropwise and the mixture is refluxed for 10 hours. After cooling, 7.6 ml. saturated aqueous ammonium chloride are added, the mixture filtered and the filtrate evaporated in vacuo. The residue is taken up in diethyl ether, the solution extracted with 5% hydrochloric acid, the aqueous layer made basic with ammonia and extracted with diethyl ether. The extract is dried, evaporated, the residue taken up in the minimum amount of isopropanol and the solution acidified with isopropanolic hydrobromic acid. The precipitate formed is filtered off and washed with isopropanol, to yield the 11-(2-dimethylaminopropyl)-9,10-ethenoanthracene of the formula

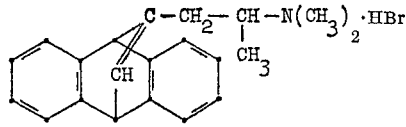

melting at 252–257°. The corresponding hydrochloride, obtained from an ethanolic solution, melts above 260°.

Example 28

To the suspension of 1.5 g. lithium aluminum hydride in 20 ml. diethyl ether, the solution of 6 g. 11-(N-methyl-N-2-dimethylaminoethylcarbamoyl) - 9,10 - ethenoanthracene in 200 ml. diethyl ether is added dropwise while stirring and the mixture is refluxed for 6 hours. After cooling, 1.5 ml. water, 3 ml., 12% aqueous sodium hydroxide and 4.5 ml. water are added in this order, the mixture filtered and the filtrate evaporated in vacuo. The residue is taken up in the minimum amount of ethanol, the solution acidified with ethanolic hydrochloric acid, the precipitate formed filtered off and the residue recrystallized from aqueous ethanol, to yield the 11-(N-methyl-N - dimethylaminoethylaminomethyl) - 9,10 - ethenoanthracene dihydrochloride of the formula

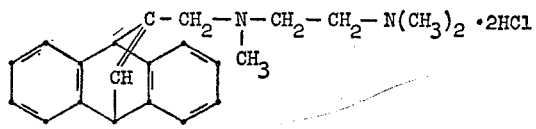

melting at 265–267°.

The starting material is prepared as follows: The mixture of 5 g. 9,10-ethenoanthracene-11-carboxylic acid chloride, 1.9 g. trimethyl-ethylenediamine and 50 ml. ethyl acetate is stirred overnight at room temperature and evaporated in vacuo. The residue is recrystallized from ethanol-diethyl ether, to yield the 11-(N-methyl-N-2-dimethylaminoethylcarbamoyl) - 9,10-ethenoanthracene hydrochloride melting at 133–135°. It is taken up in aqueous sodium hydroxide, the mixture extracted with diethyl ether, the extract dried and evaporated, to yield the corresponding free base.

Example 29

To the suspension of 1.8 g. lithium aluminum hydride and 20 ml. diethyl ether, the mixture of 7 g. 11-(4-methyl-piperazinocarbonyl) - 9,10-ethenoanthracene and 250 ml. tetrahydrofuran is added dropwise while stirring and the mixture refluxed for 6 hours. After cooling, 1.8 ml. water, 3.6 ml. 12% aqueous sodium hydroxide and 5.4 ml. water are added and the mixture filtered. The filtrate is evaporated in vacuo, the residue taken up in the minimum amount of ethanol, the solution acidified with ethanolic hydrochloric acid and the precipitate formed recrystallized from ethanol, to yield the 11-(4-methylpiperazinomethyl)-9,10-ethenoanthracene dihydrochloride of the formula

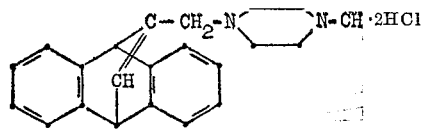

melting at 268–270°.

The starting material is prepared as follows: The mixture of 5 g. 9,10-ethenoanthracene-11-carboxylic acid chloride, 1.87 g. 1-methylpiperazine and 50 ml. ethyl acetate is refluxed for 4 hours. The precipitate formed is filtered off and recrystallized from ethanol-diethyl ether, to yield the 11-(4-methyl-piperazinocarbonyl)-9,10-ethenoanthracene hydrochloride melting above 275°. It it taken up in aqueous sodium hydroxide, the mixture extracted with diethyl ether and the extract evaporated in vacuo, to yield the corresponding free base.

Example 30

To the suspension of 2 g. lithium aluminum hydride and 50 ml. diethyl ether, the solution of 8 g. 11-dimethylcarbamoyl-12-chloro-9,10-ethenoanthracene in 100 ml. diethyl ether is added dropwise while stirring and the mixture refluxed for 24 hours. After cooling, 2 ml. water, 4 ml. 12% aqueous sodium hydroxide and 6 ml. water are added, the mixture filtered and the filtrate extracted with 15% hydrochloric acid. The extract is concentrated, cooled and the precipitate formed filtered off, to yield the 11-dimethylaminomethyl-12-chloro-9,10-ethenoanthracene hydrochloride of the formula

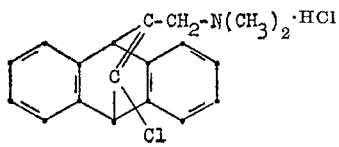

melting at 292–295°.

The starting material is prepared as follows: To the solution of 10 g. 11-chloro-9,10-ethenoanthracene in 50 ml. tetrahydrofuran kept under nitrogen at —70°, 27 ml. 1.75 N butyl lithium in hexane are added dropwise while stirring. After 2 hours, an excess of solid carbon dioxide is added portionwise and the mixture stirred and allowed to warm up to room temperature. It is diluted with diethyl ether, extracted with 100 ml. aqueous sodium bicarbonate, the aqueous layer acidified with hydrochloric acid and extracted with diethyl ether. The extract is dried, evaporated and the residue crystallized from 10 ml. boiling methanol, to yield the 12-chloro-9,10-ethenoanthracene-11-carboxylic acid melting at 260°.

The mixture of 9 g. thereof and 100 ml. thionyl chloride is stirred for 24 hours at room temperature and evaporated in vacuo. The residue is taken up in 100 ml. ethyl acetate and 25 ml. 4 N dimethylamine in ethyl acetate are added while stirring and cooling. After 30 minutes the mixture is washed with water, dried and evaporated, to yield the 11-dimethylcarbamoyl-12-chloro-9,10-ethenoanthracene.

I claim:

1. A pharmaceutical composition comprising essentially an antidepressant effective amount of 11-dimethylaminoethyl-9,10-ethenoanthracene or a therapeutically acceptable acid addition salt thereof and a pharmaceutical excipient.

References Cited

UNITED STATES PATENTS

| | | | |
|---|---|---|---|
| 3,389,177 | 6/1968 | Cidank et al. | 260—570.9 X |
| 3,399,201 | 8/1968 | Schmidt et al. | 260—570.8 X |
| 3,422,104 | 1/1969 | Schroker et al. | 260—570.9 X |
| 3,489,799 | 1/1970 | Schmidt et al. | 260—570.8 |

STANLEY J. FRIEDMAN, Primary Examiner

U.S. Cl. X.R.

260—501.1, 501.11, 501.12, 501.18, 501.21, 570.9